US008834725B2

(12) United States Patent
Bhaduri et al.

(10) Patent No.: US 8,834,725 B2
(45) Date of Patent: Sep. 16, 2014

(54) METHOD FOR TREATING ACID MINE DRAINAGE

(75) Inventors: Rahul Shankar Bhaduri, Moraga, CA (US); Alexander Kuperman, Orinda, CA (US); Michael Dubrovsky, Lafayette, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 605 days.

(21) Appl. No.: 13/017,417

(22) Filed: Jan. 31, 2011

(65) Prior Publication Data

US 2012/0193296 A1 Aug. 2, 2012

(51) Int. Cl.
| | | |
|---|---|---|
| *B01D 21/01* | (2006.01) | |
| *B03D 3/00* | (2006.01) | |
| *C02F 1/52* | (2006.01) | |
| *B01D 37/00* | (2006.01) | |
| *B01D 61/00* | (2006.01) | |
| *C02F 1/00* | (2006.01) | |
| *B01D 12/00* | (2006.01) | |
| *B01D 17/00* | (2006.01) | |
| *B01D 43/00* | (2006.01) | |
| *C02F 103/10* | (2006.01) | |
| *C02F 101/12* | (2006.01) | |
| *C02F 101/20* | (2006.01) | |
| *C02F 101/14* | (2006.01) | |

(52) U.S. Cl.
CPC .......... *C02F 1/5236* (2013.01); *C02F 2103/10* (2013.01); *C02F 2101/12* (2013.01); *C02F 2101/20* (2013.01); *C02F 2101/14* (2013.01); *C02F 2209/06* (2013.01)
USPC ........... 210/724; 210/723; 210/726; 210/727; 210/767; 210/513; 210/521

(58) Field of Classification Search
None
See application file for complete search history.

(56) References Cited

U.S. PATENT DOCUMENTS

| | | | |
|---|---|---|---|
| 3,647,361 A | | 3/1972 | Coltrinari et al. |
| 3,886,259 A | | 5/1975 | Nikolai, Jr. et al. |
| 4,219,416 A | * | 8/1980 | Ramirez et al. ............... 210/707 |
| 4,323,462 A | * | 4/1982 | Bruckenstein ................ 210/714 |
| 4,695,378 A | | 9/1987 | Ackman et al. |
| 4,950,407 A | | 8/1990 | Stahl |
| 5,171,454 A | | 12/1992 | Bockowski et al. |
| 5,215,632 A | * | 6/1993 | Fritts et al. .................... 205/503 |

(Continued)

OTHER PUBLICATIONS

Morrison, et al. "Extraction of Uranium and Molybdenum from Aqueous Solutions: A Survey of Industrial Materials for Use in Chemical Barriers for Uranium Mill Tailings Remediation", Environ. Sci. Technol., 1992, 26, 1922-1931, American Chemical Society.*

(Continued)

*Primary Examiner* — Nam Nguyen
*Assistant Examiner* — Clare Perrin

(57) ABSTRACT

A process for treating acid mine drainage containing heavy metals and soluble contaminants is provided. In one embodiment, at least a metal cation is added to the acid mine drainage at a pre-select pH to form insoluble heavy metal complexes. In one embodiment, the metal cation is a trivalent metal ion, e.g., ferric iron such as in ferric sulfate. In another embodiment, a divalent metal ion such as in ferrous sulfate is used. After the removal of the heavy metal complexes, the effluent water is treated with at least a phosphate additive to remove remaining soluble contaminants, thus producing a treated water stream with reduced levels of contaminants.

23 Claims, 1 Drawing Sheet

(56) References Cited

U.S. PATENT DOCUMENTS

| | | | | |
|---|---|---|---|---|
| 5,240,600 | A * | 8/1993 | Wang et al. | 210/188 |
| 5,482,632 | A | 1/1996 | Lomasney et al. | |
| 5,505,857 | A * | 4/1996 | Misra et al. | 210/709 |
| 5,536,416 | A | 7/1996 | Coltrinari et al. | |
| 5,550,141 | A | 8/1996 | Gould et al. | |
| 5,587,001 | A | 12/1996 | De Vries | |
| 5,616,251 | A | 4/1997 | Batarseh | |
| 5,645,730 | A * | 7/1997 | Malachosky et al. | 210/665 |
| 5,766,478 | A | 6/1998 | Smith et al. | |
| 6,001,185 | A | 12/1999 | Huff | |
| 6,001,246 | A * | 12/1999 | Suenkonis | 210/180 |
| 6,086,847 | A | 7/2000 | Thompson | |
| 6,280,630 | B1 * | 8/2001 | Ramsay | 210/711 |
| 6,586,600 | B2 | 7/2003 | Atwood et al. | |
| 6,790,352 | B1 | 9/2004 | Wurzburger et al. | |
| 6,923,914 | B2 | 8/2005 | Perriello | |
| 6,932,909 | B2 | 8/2005 | Rey | |
| 6,991,405 | B2 | 1/2006 | Barrie et al. | |
| 7,008,606 | B2 | 3/2006 | Misra et al. | |
| 7,101,429 | B2 | 9/2006 | Brown | |
| 7,153,541 | B2 | 12/2006 | Elsetinow et al. | |
| 7,247,291 | B2 | 7/2007 | Sreeram et al. | |
| 7,294,275 | B1 | 11/2007 | Sibrell | |
| 7,311,786 | B2 | 12/2007 | Fuerstenau et al. | |
| 7,455,715 | B2 | 11/2008 | Harlamovs et al. | |
| 7,491,322 | B1 | 2/2009 | Sibrell | |
| 7,704,470 | B2 | 4/2010 | Haydock | |
| 7,784,620 | B2 | 8/2010 | Sharkey, Jr. et al. | |
| 2002/0100732 | A1 | 8/2002 | Atwood et al. | |
| 2003/0062306 | A1 | 4/2003 | Perriello | |
| 2003/0089201 | A1 | 5/2003 | Harlamovs et al. | |
| 2003/0132166 | A1 | 7/2003 | Rey | |
| 2004/0040912 | A1 * | 3/2004 | McConchie et al. | 210/724 |
| 2004/0067107 | A1 | 4/2004 | Barrie et al. | |
| 2005/0036930 | A1 | 2/2005 | Elsetinow et al. | |
| 2005/0103402 | A1 | 5/2005 | Fuerstenau et al. | |
| 2007/0010701 | A1 | 1/2007 | Forrester | |
| 2007/0045189 | A1 | 3/2007 | Lichtner et al. | |
| 2007/0131143 | A1 | 6/2007 | Sreeram et al. | |
| 2007/0193413 | A9 | 8/2007 | Harlamovs et al. | |
| 2008/0221379 | A1 | 9/2008 | Barnes | |
| 2009/0114606 | A1 | 5/2009 | Sharkey, Jr. et al. | |
| 2010/0140107 | A1 | 6/2010 | Sloan | |
| 2010/0187130 | A1 | 7/2010 | Smith et al. | |
| 2010/0282686 | A1 | 11/2010 | Sharkey, Jr. et al. | |
| 2010/0307972 | A1 | 12/2010 | Bratty et al. | |
| 2010/0329790 | A1 | 12/2010 | Jin et al. | |

OTHER PUBLICATIONS

Morrison, et al. "Extraction of Uranium and Molybdenum from Aqueous Solutions: A Survey of Industrial Materials for Use in Chemical Barriers for Uranium Mill Tailings Remediation", Environ. Science Technol., 1992, 26, 1922-1931, American Chemical Society.*
Superphosphate Materials Safety Data Sheet, Paton Fertilizers, 2008, pp. 1-4.*
Costello, Acid Mine Drainage. Innovative Treatment Technologies, Oct. 2003, National Network for Environmental Management Studies (NMEMS) Program.
Fripp, Acid Mine Drainage Treatment, May 2000, U.S. Army Corps of Engineers Ecosystem Management and Restoration Research Program.
Kleinmann, Acid Water Treatment Using Engineered Wetlands, 2006, Int'l Mine Water Association.
Mendez-Ortiz, Acide rock drainage and metal leaching from mine waste material (tailings) of a Pb—Zn—Ag skarn deposit: environmental assessment through static and kinetic laboratory tests, 2007, Revista Mexicana de Ciencias Geologicas.
Ludington, Climax MO Deposits, 1986.
Chartrand, Electrochemical remediation of acid mine drainage, 2003, Kluwer Academic Publishers.
Morrison, Extraction of Uranium and Molybdenum from Aqueous Solutions: A Survey of Industrial Materials for Use in Chemical Barriers for Uranium Mill Tailings Remediation, 1992, American Chemical Society.
Kirby, Field determination of $Fe^2$ oxidation rates in acid mine drainage using a continuously-stirred tank reactor, 1998, Elsevier Science Ltd.
Gemici, Impact of Acid Mine Drainage from the Abandoned Haliköy Mercury Mine (Western Turkey) on Surface and Groundwaters, 2004 Springer-Verlag New York, Bulletin Environmental Contamination and Toxicology.
Morais, Impact of acid mine drainage from Tinoca Mine on the Abrilongo dam (southeast Portugal), Feb. 2008, Mineralogical Magazine, 2008 The Mineralogical Society.
Denimal, Leaching of coal-mine tips (Nord-Pas-de_Calais coal basin, France) and sulphate transfer to the chalk aquifer: example of acid mine drainage in a buffered environment, Jun. 22, 2002, Springer-Verlag 2002, Environmental Geology (2002).
U.S. Environmental Protection Agency, Molycorp, Inc. Site Proposed Cleanup Plan, Dec. 2009, The New Mexico Environment Department (NMED).
Cravotta, Limestone drains to increase pH and remove dissolved metals from acidic mine drainage, 1999, Applied Geochemistry, 1999 Elseiver Science Ltd.
Pérez-López, Neutralization of acid mine drainage using the final product from $CO_2$ emissions capture with alkaline paper mill waste, Journal of Hazardous Materials 2010, 2009 Elsevier B.V.
Zipper, Passive Treatment of Acid-Mine Drainage, 2009, Virginia Cooperative Extension Publication No. 460-133.
Simmons, Phosphorus Removal by Sediment in Streams Contaminated with Acid Mine Drainage, 2009 Springer Science + Business Media B.V., Water Air Soil Pollution (2010).
Mohan, Removal and recovery of metal ions from acid mine drainage using lignite—A low cost sorbent, Journal of Hazardous Materials (2006).
Wang, Removal of Arsenic from Synthetic Acid Mine Drainage by Electrochemical pH Adjustment and Coprecipitation with Iron Hydroxide, Nov. 19, 2003, Environmental Science & Technology.
Singh, Removal of Trace Elements from Acid Mine Drainage, 1985, International Journal of Mine Water.
Review of Existing and Proposed Tailings Impoundment Technologies, Sep. 25, 2008, U.S. Environmental Protection Agency.
Carlson, Scavenging of As from Acid Mine Drainage by Schwertmannite and Ferrihydrite: A Comparison with Synthetic Analogues, 2002, Environmental Science & Technology.
Faulkner, The Largest Acid Mine Drainage Treatment Plant in the World?, Apr. 19-20, 2005, $26^{th}$ West Virginia Surface Mine Drainage Task Force.
Clyde, The use of passive treatment alternatives for the mitigation of acidic drainage at the Williams Brother mine, California: Bench-scale study, 2010, Applied Geochemistry, Elsevier Ltd.
Prasad, Treatment of Acid Mine Drainage Using Fly Ash Zeolite, Oct. 20, 2010, Water Air Soil Pollution, School of Earth and Environment, University of Leeds, Springer Science+Business Media B.V.
Sahinkaya, Sulfidogenic fluidized bed treatment of real acid mine drainage water, Bioresource Technology, 2010 Elseiver Ltd.

* cited by examiner

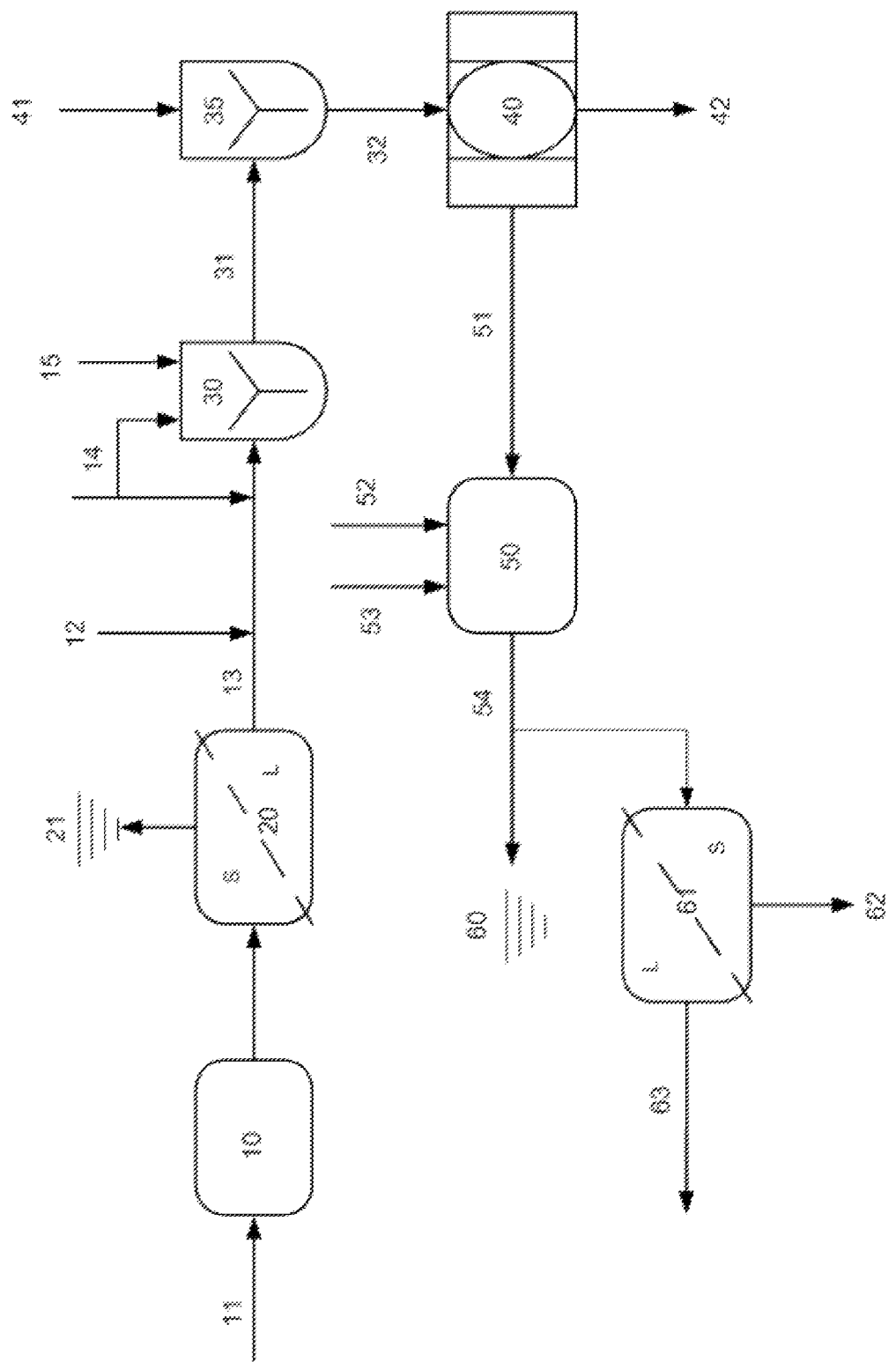

US 8,834,725 B2

METHOD FOR TREATING ACID MINE DRAINAGE

TECHNICAL FIELD

The invention relates to methods for treating waste and effluent waters emanating from sources including but not limited to excavations and mining operations.

BACKGROUND

Excavations such as mining operations, milling operations, road constructions, etc., generate effluents which may require treatment prior to discharge. These effluents include, for example, acid mine drainage (AMD), mill tailings, excess decant water, seepages, and acidic process waste streams. Acid mine drainage (AMD) forms when minerals in rocks are exposed to oxidizing conditions in mining operations, highway construction, and other large scale excavations.

Prior art methods for treating excavation effluents generally require extensive capital outlay and are specific in application to a particular effluent. In one example, lime neutralization to pH around 11 is used to remove a majority of contaminants. However, lime neutralization does not work with some metals such as antimony, vanadium, arsenic and molybdenum, and does not work well with anions such as sulfates, fluorides, nitrates and chlorides. In other examples, technologies developed for sulfate reduction may work to remove certain anions to government-mandated levels together with anionic species such as fluorides. However, they do not particularly work well with molybdenum and require 2-stage clarification/separation steps to isolate precipitates that interfere with downstream metal removal. Desalination technologies, e.g., membrane processes using reverse osmosis and ion-exchange, may work in removing molybdenum. However, they are expensive technology options and are prone to scaling issues due to calcium sulfate precipitation.

There is a need for improved methods for treating excavation effluents, particularly effluents with concentrations of anions such as fluorides, sulfates, molybdates, arsenates etc., as well as heavy metals such as nickel, cobalt, manganese, chromium, and the like.

SUMMARY OF THE INVENTION

In one aspect, there is provided a method for treating acid mine drainage to reduce the concentration of heavy metals and soluble contaminants. The acid mine drainage contains at least a heavy metal selected from molybdenum, tungsten, chromium, arsenic, and vanadium, and at least a soluble anionic species selected from nitrate, nitrite, sulfate, fluoride, and chloride. The method comprises the steps of: contacting the acid mine drainage with at least a trivalent and/or a divalent metal ion source in an amount effective and at a pre-select pH for the trivalent metal and/or the divalent metal ion source to form at least an insoluble complex with at least one of the heavy metals; performing a liquid solid separation to remove the heavy metal complex forming a first effluent; adjusting the pH of the first effluent to an alkaline range; adding at least a phosphate additive to the first effluent having an alkaline pH to cause at least one of the soluble anionic species to form a precipitate; performing a liquid solid separation to remove the precipitate, forming a treated effluent.

In one embodiment, the metal ion source comprises ferric iron and/or ferrous ion, and the phosphate additive comprises triple superphosphate.

BRIEF DESCRIPTION OF THE DRAWING

FIG. 1 is a block diagram illustrating one embodiment of a process to treat acid mine drainage to reduce contaminants.

DETAILED DESCRIPTION

The following terms will be used throughout the specification and will have the following meanings unless otherwise indicated.

"ppm" refers to parts per million. One ppm is equivalent to 1 mg per liter.

LSI refers to the Langelier Saturation index, an equilibrium model derived from the theoretical concept of saturation and provides an indicator of the degree of saturation of water with respect to calcium carbonate. It can be shown that the Langelier saturation index (LSI) can be correlated to the base 10 logarithm of the calcite saturation level. The Langelier saturation level approaches the concept of saturation using pH as a main variable. The LSI can be interpreted as the pH change required to bring water to equilibrium. Water with a negative LSI means that there is little or no potential for scale to form, with the water typically dissolving $CaCO_3$. If the LSI is positive, scale will typically form and $CaCO_3$ precipitation will typically occur.

"Tailings" or "tailing" (also known as slimes, tails, or leach residue) refers to waste or materials remaining after the process of separating the valuable fraction from the uneconomic fraction of an ore.

Overburden or waste rock refers to the materials overlying an ore or mineral body that are displaced during mining without being processed.

"AMD" or acid mine drainage, or acid rock drainage (ARD), refers to effluents from extractions and/or excavations, characterized by acidity and metals which may include aluminum, antimony, cadmium, chromium, cobalt, copper, iron, lead, magnesium, manganese, molybdenum, nickel, zinc and others. In one embodiment, AMD is a consequence of the decomposition of pyrite ($FeS_2$) and pyrrhotite [$Fe_{(1-x)}$S] in waste rock upon exposure to water and oxygen, resulting in the groundwater becoming acidified and contaminated with dissolved metals and sulfates.

The term mine here includes mining, referring to active, inactive, or abandoned extraction and or excavation operations for removing minerals, metals, ores and/or coal from the earth. Examples of extraction operations include minerals, metals and ores including limestone, talc, gold, silver, iron, zinc, manganese, molybdenum, antimony, chromium, and nickel.

As used herein, the term "aerated" refers to the natural and/or mechanical methods of mixing air and water. Any suitable mechanical aeration device can be used. Suitable devices are described in U.S. Pat. Nos. 3,142,639 and 4,695,379, the references are including herein by reference.

Environmental regulations throughout the world such as those promulgated by the US EPA under CAA, RCRA and CERCLA, as well as state and local authorities, require material producers to manage water effluents and wastes from extractions/excavations. Concentration of certain minerals/metals in water effluents must be contained below regulatory levels. Many states in the US have standards for the treatment of reclaimed water to be used for crop irrigation. State agencies, e.g., the Colorado Department of Public Health and Environment (DPHE), have classifications system establishing water use categories. Waters are classified according to the uses for which they are presently suitable or intended to become suitable, e.g., domestic water supply, irrigation of crop, etc. For example, the 2000 DPHE MCL ("Maximum Contaminant Level") standard for nitrate/nitrite in irrigation water is 100 mg/L, the total dissolved solids (TDS) MCL is 500 mg/L, the fluoride MCL is 4 mg/L, the sulfate MCL is 500 mg/L. No MCL currently exists for vanadium; however, the Superfund Removal Action Level for vanadium is 250 ug/l. New Mexico MCL for arsenic is 0.02 mg/L. The EPA has not established an MCL for molybdenum in drinking water. The EPA has developed a health advisory for children of 0.08 mg/L and a lifetime health advisory of 0.04 mg/L of molybdenum in drinking water.

In one embodiment, the invention relates to an improved method to remove and or treat contaminants/minerals from AMD, e.g., effluents, run-off, and seepage, from mines, coal refuse piles, construction sites, and other locations wherein rock formations have been disturbed, excavated, exposed to water sources such as rainfall, surface water, and subsurface water sources, such that the water contains metals and minerals in solution or suspension. Specifically, the invention relates to an improved method for treating AMD to reduce heavy metals such as chromium, cobalt, zinc, nickel etc., and anionic species such as arsenate, vanadate, molybdate, fluoride and sulfate down to a level meeting regulatory requirements. After treatment, the treated water meeting regulatory requirements can be returned to the environment.

AMD Contaminants for Treatment:

As used herein, the term AMD refers to the water to be treated, which includes all sources of effluents from excavations, including AMD as well as tailings water and effluents, seepage from tailings facilities, leach residues, as well as seepage, well water, mine water and effluents from waste rock piles obtained from the excavation.

The term "treatment" refers to the steps or processes for the removal of metals and dissolved anionic species in AMD. It is not a single step or process, but can occur at various stages of the process to be described herein, where a combination of chemical and/or physical mechanisms are involved.

Depending on the location and amount of mineral deposits, the AMD in one embodiment is from an ore containing materials including magnetite, zircon, rutile, manganosiderite, fluorite, molybdenite, chalcopyrite, sphalerite, galena, fluorite. In one embodiment, some ores may include light gravity minerals (less than 2.9 specific gravity) such as quartz, orthoclase, oligoclase, biotite, calcite, and chlorite.

Depending on the ore location, the mineralogy of AMD in one embodiment may comprise quartz, plagioclase feldspar, potassium feldspar, biotite, chlorite, amphibole, calcite and sulfide minerals. The sulfide minerals in one embodiment include pyrite, sphalerite, chalcopyrite and molybdenite with trace amounts of galena, covellite and pyrrhotite, with the minerals as potential sources of acidity and dissolved metals including aluminum, cadmium, chromium, cobalt, copper, iron, lead, magnesium, manganese, molybdenum, nickel, zinc and others.

Depending on the source, the excavation means, the tailing impoundment means, the water source, the AMD in one embodiment contains soluble species including but not limited to fluorides, sulfates, cadmium, cobalt, manganese, molybdenum, and nickel. In another embodiment, the AMD contains one or more metal ions or salts of iron, copper, zinc, lead, mercury, cadmium, arsenic, barium, selenium, silver, chromium, aluminum, manganese, nickel, cobalt, uranium, and antimony. In one embodiment, the water has a positive LSI.

In one embodiment, the AMD has a pH from 2.0 to 10.0; often from 3.0 to 6.0 and typically in the range of 3.5 to 5.5. The AMD has a calcium hardness of greater than 200 ppm in one embodiment; greater than 400 ppm in a second embodiment; and greater than 600 ppm in a third embodiment.

One heavy metal that may be dissolved in aqueous effluents of base metal mines is molybdenum. In one embodiment of tailing ponds associated with copper mines, the Mo concentration ranges from 1 to 30 ppm. In another embodiment, the tailings water from a uranium mill contains dissolved Mo in an amount of up to 900 ppm.

Removal of Heavy Metals from the AMD:

In one embodiment, the pH of the AMD is first adjusted to a pH value at which selective precipitation of the heavy metal complexes occurs ("pre-selected pH") with the addition of at least a metal cation selected from divalent and trivalent metal cations ("metal cation"). In one embodiment, the pre-select pH is between 2.0 to 6.0. In another embodiment, from 3.0 to 5.0. This can be accomplished by the addition of at least an acid with a relatively high ionization constant. In one embodiment, the acid is used in a strength ranging from 1.0 to 12.0 normal. In another embodiment, sulfuric acid is used in view of its availability and low cost.

The metal cation is added to the AMD to scavenge heavy metals such as molybdenum, tungsten, chromium, arsenic, antimony and vanadium from the AMD. In one embodiment, the metal cation is selected from the group of iron, cobalt, aluminum, rhenium, and combinations thereof.

By varying the concentration of the metal cations to heavy metal ions and the pH, nearly total removal of dissolved heavy metal ions can be achieved, wherein the heavy metal ions are converted to heavy metal insoluble complexes for subsequent removal. In one embodiment, at least 50% of the heavy metals can be removed as precipitate with the rest remaining in solution. In another embodiment, the removal rate is at least 75%. In a third embodiment, at least 90% of a heavy metal is removed as a precipitate. In yet another embodiment, the removal rate is at least 96% as precipitate. In one embodiment, the concentration of a heavy metal such as V is reduced to less than detectable limit of 0.005 ppm. In another embodiment, Mo is reduced to a level of 0.08 ppm or less. In yet another embodiment, As is reduced to 0.003 ppm or less.

In one embodiment, the metal cation is a trivalent cation is ferric iron, e.g., ferric sulfate, in view of its availability, low cost, and ease of use. In another embodiment, the metal cation is provided as ferric chloride solution. In another embodiment, the metal cation is divalent metal cation, e.g., ferrous sulfate. In yet another embodiment, the metal cation is aluminum, e.g., hydrous aluminum oxide, provided at a pH of about 5.2.

In one embodiment with the use of a divalent metal cation such as ferrous iron, oxidizing means such as aeration or an oxidizing agent is provided to convert the divalent metal iron into a trivalent metal ion, e.g., ferric iron. Air injection of the AMD stream/tank can be continuous or intermittent. The injection rate in one embodiment varies from 2 Lpm to 20 Lpm per 100 gpm (gallon per minute) flow for a conversion based on 50 ppm of ferrous iron, for full conversion into ferric iron, assuming 50% oxygen utilization. In another embodiment, hydrogen peroxide is employed to oxidize the divalent metal cation for precipitation of the heavy metal complexes In one embodiment, the metal cation is added to the AMD in an amount sufficient to provide from about 6 to 50 ppm (parts per million) of metal cation to each ppm of the metal to be removed from the AMD. The addition of the metal cation enables the formation of insoluble heavy metal complexes such as iron molybdate, tungstate, vanadate, antimonate, arsenate and the like, depending on the source and original concentration of heavy metals in the AMD. In one embodiment with the use of aluminum as the trivalent cation, the quantity of aluminum required is greater than that of iron.

It should be noted that the "treatment" or contact time between the effluent AMD and the additive such as a metal cation, or the residence time in the mixing tank varies depending on factors including but not limited to the size of the equipment and effluent flow rate. In one embodiment, treatment with the metal cation is for at least a retention time of 3 minutes under agitation and aeration to enable the formation of the insoluble heavy metal salts. In another embodiment, the retention time ranges from 5 minutes to 2 hrs. In yet another embodiment, the retention time is for at least an hour. The treatment is at a temperature ranging from ambient to 60° C. in one embodiment, and from 40 to 80° C. in a second embodiment. The treatment can be suitably conducted at atmospheric pressure.

Liquid Solid Separation to Remove Solids:

Depending on the source and concentration of the contaminants in the AMD, the level of solids containing heavy metal precipitate in the AMD after treatment can be quite low, e.g., less than 1 wt % in one embodiment, and less than 0.5 wt. % in a second embodiment. In the next step, the AMD stream containing heavy metal precipitate along with any insoluble iron oxyhydroxides is subject to liquid solid separation to remove effluent water for further treatment. The metal precipitate in one embodiment may be slime-like in character. In another embodiment, the precipitate may be in the form of suspended matter as fine particulates.

In one embodiment, the liquid solid separation is achieved via the 'body feed' addition of a material such as calcium silicate or diatomaceous earth or cellulose. In one example, the AMD slurry containing the insoluble metal complexes is body fed with 1,000-20,000 ppm of diatomaceous earth. The diatomaceous earth provides a matrix for holding the fine particulates together, assisting solids filterability through the use of a plate and frame filter.

In another embodiment, the liquid solid separation to remove the metal precipitate is via coagulation/flocculation/clarification. In one example, at least a flocculent is first added to the AMD. In one embodiment prior to the addition of the flocculent, the pH of the AMD is adjusted to control the size of the coagulated particles, density of the slime, as well as the tendency and rate of settling of the solids. Flocculants are well-known in the art. Examples include but are not limited to natural and synthetic organic polymers, e.g., anionic polymers such as hydrolyzed polyacrylamides. The flocculent in one embodiment facilitates the precipitation of the heavy metal complexes. In one embodiment, the flocculent addition results in flocs that are buoyed to the surface which can be skimmed from the surface to remove the metal complexes. In another embodiment, the flocculent binds to the metal complexes, resulting in an aggregation of solids that subsequently settle out.

In one embodiment, inclined plate settlers or lamella clarifiers are employed for the flocculation/clarification step. AMD containing insoluble heavy metal complexes enters the lamella clarifier, where it is flash mixed with the polymer flocculent and then gently agitated with a separate mixer. In one embodiment, as the liquid flows up the inclined plates, the flocculated material containing the heavy metal complexes settle out from the stream, allowing water containing soluble cationic and anionic species to be collected for further treatment. After the removal of the insoluble metal complexes, the concentration of heavy metals such as Mo, V, As, etc., in the collected water effluent is reduced to 1 ppm in one embodiment, less than 0.5 ppm in another embodiment, and less than 0.1 ppm in a third embodiment.

Removal of Other Soluble Contaminants:

In one embodiment after the removal of heavy metals such as Mo, V, As and Sb, the effluent water still contains soluble cationic and anionic species initially present in the AMD such as aluminum, cadmium, cobalt, manganese, nickel, silica, fluorides, sulfates and the like. The concentration of these soluble species are lowered to regulatory levels upon contact with a phosphate additive, e.g., phosphoric acid and a calcium salt and/or a phosphate salt at a pre-selected pH, e.g., an alkaline pH.

In one embodiment, the pH of the effluent water is first adjusted to an alkaline value at which maximum removal of contaminants will occur with the phosphate treatment. In one embodiment, the alkaline pH is at between 9 and 13. In a second embodiment, the pre-select pH is at least 10. The pH can be increased in one embodiment with lime supplementation.

In one embodiment, phosphoric acid can be any of wet process amber phosphoric acid, wet process green phosphoric acid, hydrophosphoric acid, technical grade phosphoric acid, and mixtures thereof. In one embodiment with the addition of phosphoric acid, at least a salt of calcium bicarbonate is added for the generation of a soluble phosphate based calcium compound, e.g., $Ca(H_2PO_4)_2$ or CDHP.

In one embodiment, the phosphate additive is selected from the group including but not limited to hydroxyapatite, hexametaphosphate (HMP), polyphosphates, monocalcium phosphate, dicalcium phosphate, tricalcium phosphate, calcium orthophosphates, phosphate fertilizers, phosphate rock, pulverized phosphate rock, calcium orthophosphates, animal bone phosphate, and combinations thereof. Phosphate fertilizers refer to monoammonium phosphate (MAP), diammonium phosphate (DAP), single superphosphate (SSP), and triple superphosphate (TSP).

In one embodiment, the additive is a soluble phosphate based calcium compound, e.g., $Ca(H_2PO_4)_2.H_2O$ or CDHP, that is added to the alkaline slurry at a pH of greater than 10. CDHP is a readily available and inexpensive fertilizer chemical, showing a strong propensity for fluoride and sulfate removal, in addition to removing/reducing the concentration of metals in the AMD. Depending on the starting concentration of fluoride and sulfate, in one embodiment, the use of CDHP reduces the fluoride and sulfate level to less than 1 ppm and 250 ppm respectively. In one embodiment, the additive is added to the alkaline AMD in an amount sufficient to provide from about 500 ppm to 2,000 ppm of phosphorus content.

In one embodiment, the pH of the AMD is maintained at a basic level during treatment to cause at least one of the soluble anionic species to form a precipitate. In one embodiment, an alkaline pH is maintained with the continuous addition of agents known in the art, e.g., lime (CaO (quicklime) or $Ca(OH)_2$ (hydrated lime)), calcium carbonate ($CaCO_3$), etc.

In one embodiment, the treatment under agitated conditions with an additive such as calcium dihydrogen phosphate monohydrate is for at least 3 minutes. In another embodiment, the treatment ranges from 5 minutes to 2 hrs. In yet another embodiment, the treatment is for at least an hour. The treatment is at a temperature ranging from ambient to 60° C. in one embodiment, and from 40 to 80° C. in a second embodiment. The treatment in one embodiment generates a dense solid volume at a fairly fast settling rate, which solid can be subsequently removed using liquid-solid separation means known in the art to generate treated water. In one embodiment, the treated water contains less than 1 ppm fluoride, and less than 300 ppm sulfate. In one embodiment, the treated water contains less than 0.010 ppm nickel, less than 0.005 ppm manganese, less than 0.02 ppm aluminum, and less than 0.05 ppm zinc. In one embodiment, the treated water contains less than 0.003 ppm arsenic, less than 0.08 ppm molybdenum, less than 0.005 ppm vanadium, and less than 0.005 ppm antimony.

After treatment of the AMD to remove the contaminants of concern, the treated and unfiltered water may be pumped to a mill tailings impoundment for storage. In one embodiment for recycling treated and filtered water for on-site or off-site re-use, the pH is adjusted towards the neutral range to prevent deposition of hard carbonate scale in filters and distribution piping. In another embodiment, the treated and filtered water is returned to the environment by way of a suitable waterway, the pH is adjusted to less than 9 to meet local effluent discharge regulations. In one embodiment, addition of carbon dioxide is performed in order to reduce the pH to meet discharge requirements. Carbon dioxide ($CO_2$) is a commonly used reagent for pH adjustment from the alkaline range. $CO_2$ reacts reversibly with water to form carbonic acid, which deprotonates (loses its hydrogen cation) causing the pH to decrease (due to the $H^+$ in solution). Non-limiting examples of suitable waterways include spillways, rivers, streams, lakes, and the like. "Spillway" refers to a waterway beginning at a point of discharge from a final settling pond at a water treatment site and ending where the water in the waterway enters a naturally occurring waterway through gravity flow.

Reference will be made to FIG. 1 which is a block diagram schematically illustrating an embodiment of a process to treat acid mine drainage from an excavation, which contains contaminants that are above regulatory limits. The process as shown comprises of a number of treatment zones, with one or more of the treatment zones operating in a batch flow mode, a sequential mode, or a continuous flow mode having a continuous or periodic AMD inflow.

The AMD to be treated enters the treatment system through conduit 11 and is contained in a stirred storage vessel 10. In one embodiment, an AMD feed having a pH of about 8.0, containing mill flotation tailing, is first passed through a plate & frame filter 20 to separate out solids 21, yielding an effluent stream 13 for treatment. The solids 21 are transported to a tailings impoundment. The effluent stream 13 is combined with AMD 12 from other sources, e.g., mine water or recovery well water, and fed to aeration tank 30. The water is treated with a metal ion source 14, e.g., iron sulfate and sulfuric acid 15, and mechanically stirred and aerated. Sulfuric acid 15 is added in sufficient amounts to control the effluent pH between 4 and 4.5.

The treated stream containing suspended heavy metal precipitates 31 with pH of between 4 and 4.50 is pumped to a slowly stirred holding tank 35, wherein a high molecular weight pre-mixed anionic polymer 41 is added to flocculate and aggregate the dispersed iron oxy-hydroxide particulates. The flocculated slurry 32 is gravity fed to an inclined plate settler 40 to create a dense sludge 42, which can be pumped to a tailings impoundment or filtered and removed for disposal. The clear supernatant stream 51 is sent to a stirred tank 50, wherein sufficient amount of slaked lime 52 is continuously added to raise and maintain the pH to at least about 10. A phosphate compound 53 such as CDHP is added in conjunction with the lime in sufficient amounts to remove cationic and anionic soluble contaminants to target discharge standards.

In one embodiment as shown, the alkaline slurry 54 is pumped to a tailings impoundment 60 or filtered 61 and the solids 62 removed for disposal. The clarified filtrate 63 is treated with $CO_2$ to ensure effluent discharge pH requirements are met.

EXAMPLES

The following illustrative examples are intended to be non-limiting. Chemical treatment was performed in a Kontes 500-mL or 1000-mL flask with stirring and air sparging through a glass frit, or in 1-liter plastic bottles placed on a shaker table. Splits of each sample were vacuum filtered through sterilized 0.45-micron pore membranes and the filtrates were assayed for metal content using a Thermo Fisher Scientific, Iris Advantage Inductively Coupled Plasma (ICP) spectrometer and a Perkin Elmer 6000 ICP-Mass Spectrometer; anionic species were analyzed by ion chromatography on a Dionex IC 25 unit with a carbonate/bicarbonate eluant system on AS-12 columns.

Example 1

An effluent stream "A" from an excavation site is produced for treatment. The stream has the concentration as indicated in Table 1.

Example 2

A stream "C" is produced for treatment with the concentration as indicated in Table 1.

TABLE 1

| Properties | Stream A | Stream C |
|---|---|---|
| pH @~20° C. | 4.30 | 7.90 |
| Total dissolved solids (mg/L) | 845 | 852 |
| $F^-$ (ppm) | 21 | 7 |
| $Cl^-$ | 21 | 11 |
| $NO_3^-$ | 10 | 8.6 |
| $SO_4^{2-}$ | 920 | 800 |
| Al | 50.58 | 0.065 |
| As | <0.003 | <0.003 |
| B | <0.1 | <0.1 |
| Ba | <0.1 | <0.1 |
| Bi | <0.1 | <0.1 |
| Cd | 0.034 | 0.019 |
| Co | 0.15 | 0.13 |
| Cr | <0.1 | <0.1 |
| Cu | 0.53 | <0.005 |
| Fe | 0.1 | <0.1 |
| K | 3.3 | 5.4 |
| Li | <0.1 | <0.1 |
| Mg | 98.1 | 92.8 |
| Mn | 17.64 | 25.6 |
| Mo | <0.1 | 2.1 |
| Ni | 0.45 | 0.26 |
| P | <0.1 | <0.1 |
| Pb | <0.1 | <0.1 |
| Si | 14.2 | 5.5 |
| Sn | <0.1 | <0.1 |
| Sr | 0.7 | 4.1 |
| Ti | <0.1 | <0.1 |
| V | <0.1 | <0.1 |
| Zn | 4.01 | 1.89 |

Example 3

Several samples of "A" from Example 1 were treated at varying pH with lime and aeration over 1-hour of reaction time as shown in Table 2. The amount of lime added ranged from 171 ppm (Test #2) to 482 ppm (Test #7). Aeration means air sparging in liter per minute (Lpm). The final concentrations after treatment are shown in Table 3, depicting the reduction in level of a number of metals at a pH of 9 or above.

TABLE 2

| Test No | Description | Lime (ppm) | Initial pH | Final pH | Aeration Rate (Lpm) |
|---|---|---|---|---|---|
| 1 | Control - Sample A (as-is) | 0 | 4.4 | 4.3 | 0 |
| 2 | Lime—CaO + Aeration | 171 | 7.2 | 7.3 | 2 to 3 |
| 3 | Lime—CaO + Aeration | 195 | 8.2 | 7.7 | 2 to 3 |
| 4 | Lime—CaO, NO Aeration | 341 | 9.0 | 8.0 | 0 |
| 5 | Lime—CaO + Aeration | 246 | 9.0 | 8.1 | 2 to 3 |
| 6 | Lime—CaO + Aeration | 351 | 9.8 | 8.2 | 2 to 3 |
| 7 | Lime—CaO + Aeration | 482 | 10.9 | 8.7 | 2 to 3 |
| 8 | Lime—CaO + Aeration | 413 | 9.9 | 9.0 | 2 to 3 |

TABLE 3

| Species | Untreated (ppm) | Test 1 | Test 2 | Test 3 | Test 4 | Test 5 | Test 6 | Test 7 | Test 8 |
|---|---|---|---|---|---|---|---|---|---|
| $F^-$ | 21 | 18 | 8.8 | 10 | 12 | 13 | 13 | 14 | 9.5 |
| $Cl^-$ | 21 | 22 | 19 | 19 | 21 | 19 | 20 | 19 | 23 |
| $NO_3^-$ | 10 | 6.5 | 6.7 | 6.9 | 6.9 | 6.7 | 6.3 | 6.5 | 7.5 |
| $SO_4^{2-}$ | 920 | 1,000 | 1,000 | 1,000 | 920 | 1,000 | 1,000 | 1,000 | 1000 |
| $PO_4^{3-}$ | <0.1 | — | — | — | — | — | — | — | — |
| Al | 50.6 | 49.2 | 0.118 | 0.197 | 3.7 | 1.000 | 0.495 | 0.516 | 1.9 |
| As | <0.003 | <0.003 | <0.003 | <0.003 | <0.003 | <0.003 | <0.003 | <0.003 | <0.003 |
| Cd | 0.034 | 0.0323 | 0.027 | 0.011 | <0.001 | 0.003 | <0.001 | <0.001 | <0.001 |
| Co | 0.2 | 0.138 | 0.082 | 0.033 | <0.004 | <0.004 | <0.004 | <0.004 | <0.004 |
| Cu | 0.5 | 0.4 | <0.005 | <0.005 | <0.005 | <0.005 | <0.005 | <0.005 | <0.005 |
| Fe | 0.1 | 0.1 | <0.1 | <0.1 | <0.1 | <0.1 | <0.1 | <0.1 | <0.1 |
| Mn | 17.6 | 17.8 | 15.300 | 13.100 | 0.3 | 6.300 | 0.900 | 0.039 | 0.01 |
| Mo | <0.1 | <0.01 | <0.010 | <0.010 | <0.010 | <0.010 | <0.010 | <0.010 | <0.010 |
| Ni | 0.5 | 0.4 | 0.300 | 0.097 | <0.01 | 0.009 | 0.009 | <0.009 | <0.010 |
| P | <0.1 | <0.1 | <0.1 | <0.1 | <0.1 | <0.1 | <0.1 | <0.1 | <0.1 |
| Si | 14.2 | 14.3 | 4.4 | 2.1 | 0.6 | 0.7 | 0.9 | 0.9 | 0.9 |
| Sr | 0.7 | 0.8 | <0.1 | <0.1 | 0.8 | <0.1 | <0.1 | <0.1 | 0.7 |
| Zn | 4.0 | 3.9 | <0.1 | 0.067 | <0.01 | <0.067 | <0.067 | <0.067 | <0.01 |

Example 4

Several samples of stream "A" from Example 1, Table 1 were treated with lime, a soluble phosphate based calcium compound ($Ca(H_2PO_4)_2 \cdot H_2O$ or CDHP), a mixture of lime and CDHP, and with and without aeration as shown in Table 4. The final concentrations after treatment are shown in Table 5. The dramatic effect of phosphate treatment at high pH levels on the concentration of species such as fluoride, sulfate and aluminum is evident.

TABLE 4

| Test No | Additive Description | CDHP (ppm) | P (ppm) | Lime (ppm) | Final pH |
|---|---|---|---|---|---|
| 1 | Control - Sample A (as-is) | 0 | 0 | 0 | 4.4 |
| 2 | Lime (CaO) | 0 | 0 | 341 | 8.0 |
| 3 | Lime (CaO) + Aeration | 0 | 0 | 413 | 9.0 |
| 4 | P as $Ca[H_2PO_4]_2$ | 3,980 | 1,055 | 0 | 3.1 |
| 5 | P as $Ca[H_2PO_4]_2$ + CaO | 4,098 | 1,086 | 6,206 | 11.0 |
| 6 | P as $Ca[H_2PO_4]_2$ + CaO + Aeration | 4,071 | 1,079 | 5,500 | 12.1 |

TABLE 5

| Species | Un-treated (ppm) | Test 1 | Test 2 | Test 3 | Test 4 | Test 5 | Test 6 |
|---|---|---|---|---|---|---|---|
| $F^-$ | 21 | 18 | 12 | 9.5 | 14 | <0.2 | <0.2 |
| $Cl^-$ | 21 | 22 | 21 | 23 | 20 | 24 | 19 |
| $NO_3^-$ | 10 | 6.5 | 6.9 | 7.5 | 6.9 | 22 | 6.2 |
| $SO_4^{2-}$ | 920 | 1000 | 920 | 1000 | 960 | 200 | 240 |
| $PO_4^{3-}$ | <0.1 | — | — | — | 2,300 | — | — |
| Al | 50.6 | 49.2 | 3.7 | 1.9 | 50.9 | <0.002 | <0.002 |
| As | <0.003 | <0.003 | <0.003 | <0.003 | <0.003 | <0.003 | <0.003 |
| Cd | 0.034 | 0.0323 | <0.001 | <0.001 | 0.0185 | <0.001 | <0.001 |
| Co | 0.2 | 0.138 | <0.004 | <0.004 | 0.1 | <0.004 | <0.004 |
| Cu | 0.5 | 0.4 | <0.005 | <0.005 | 0.5 | <0.005 | <0.005 |
| Fe | 0.1 | 0.1 | <0.1 | <0.1 | 0.3 | <0.1 | <0.1 |
| Mn | 17.6 | 17.8 | 0.3 | 0.0148 | 18 | <0.01 | <0.004 |
| Ni | 0.5 | 0.4 | <0.01 | <0.01 | 0.4 | <0.01 | <0.01 |
| P | <0.1 | <0.1 | <0.1 | <0.1 | HIGH | <0.1 | <0.1 |
| Si | 14.2 | 14.3 | 0.6 | 0.9 | 15.3 | <1 | 0.2 |
| Sr | 0.7 | 0.8 | 0.8 | 0.7 | 1.1 | 0.7 | 1.2 |
| Zn | 4.0 | 3.9 | <0.01 | <0.01 | 3.8 | <0.01 | <0.01 |

Example 5

In this example, several samples of stream "C" from Example 2, Table 1 were treated individually with lime, CDHP, an insoluble phosphate mineral hydroxyapatite (HAP or $Ca_5(PO_4)OH$) or a combination of the above at various pH with and without aeration over 1-hour of reaction time as shown in Table 6. The amount of added HAP in terms of P content ranged from around 500 ppm to 1,000 ppm (Tests 5 through 9). The amount of added CDHP in terms of P content was around 1,500-ppm (Tests 10 through 12). Table 7 depicts that the final species concentrations, after treatment with CDHP (Tests 10 through 12), were mostly lowered to non-detectable levels at a pH greater than 10.

TABLE 6

| Test No | Sample Description | HAP (ppm) | P (ppm) | CDHP (ppm) | P (ppm) | Lime (ppm) | Final pH |
|---|---|---|---|---|---|---|---|
| 1 | Control - Sample C (as-is) | — | — | — | — | 0 | 6.9 |
| 2 | Aeration - Sample C (as-is) | — | — | — | — | 0 | 7.9 |
| 3 | Lime (CaO) | — | — | — | — | 130 | 9.7 |
| 4 | Lime (CaO) | — | — | — | — | 352 | 11.20 |
| 5 | P as HAP | 5,795 | 1,074 | — | — | 0 | 7.1 |
| 6 | P as HAP + CaO | 3,022 | 560 | — | — | 124 | 9.6 |
| 7 | P as HAP + CaO | 5,437 | 1,007 | — | — | 104 | 9.6 |
| 8 | P as HAP + CaO | 5,585 | 1,035 | — | — | 300 | 10.94 |
| 9 | Aeration + CaO + HAP | 5,345 | 990 | — | — | 105 | 9.2 |
| 10 | P as CDHP + CaO | — | — | 6,172 | 1,519 | 2,437 | 11.90 |
| 11 | P as CDHP + CaO | — | — | 6,180 | 1,520 | 2,313 | 8.50 |
| 12 | P as CDHP + CaO | — | — | 5,990 | 1,474 | 2,513 | 10.10 |

Example 6

In this example, several samples of stream "C" from Example 2, Table 1 were reacted with ferric iron (as ferric sulfate) and lime or sulfuric acid at various concentrations and pH for up-to 1 hour. Following treatment, half of the sample was filtered to remove iron solids. The clarified and unfiltered portions were reacted with CDHP and lime at various pH for a period of up-to 1-hour. The test conditions are shown in Table 8. The final concentrations of various species after treatment are shown in Table 9, demonstrating the reduction in the level of heavy metals as well as soluble anionic species with ferric ion treatment followed by CDHP and lime treatment.

Tests 3 and 4 indicate that molybdenum and other contaminants may be reduced according to the following sequence: a) Ferric ion at 35 to 45-mg/L is reacted with AMD water at pH between 4 & 4.5 for up-to an hour; b) the acidic slurry undergoes liquid-solid separation; and c) CDHP at 4,000-ppm is reacted with the clarified effluent at pH ~11 for up-to an additional hour.

In the Example, separation of the acidic iron sludge from the clarified effluent, following iron treatment, helps with the reduction of heavy metal concentrations, otherwise re-dissolution of the precipitated molybdenum occurs during subsequent reaction with CDHP at the highly basic slurry pH.

TABLE 8

| Test No | Sample Description | Fe (ppm) | CDHP (ppm) | P (ppm) | Lime (ppm) | Final pH |
|---|---|---|---|---|---|---|
| 1A | $Fe^{+3}$ + CaO, 1-hr, FILTERED | 10 | 0 | 0 | 0 | 6.80 |
| 1B | $Fe^{+3}$ + CaO, 1-hr, UNFILTERED | 10 | 0 | 0 | 0 | 6.80 |
| 1C | FILTERED CDHP + CaO, 1-hr | — | 4,121 | 1,014 | 5,165 | 12.10 |
| 1D | UNFILTERED CDHP + CaO, 1-hr | — | 4,202 | 1,034 | 4,737 | 12.20 |
| 2A | $Fe^{+3}$ + CaO, 1-hr, FILTERED | 29 | 0 | 0 | 19 | 6.40 |
| 2B | $Fe^{+3}$ + CaO, 1-hr, UNFILTERED | 29 | 0 | 0 | 19 | 6.40 |
| 2C | FILTERED CDHP + CaO, 1-hr | — | 4,232 | 1,041 | 3,465 | 11.65 |
| 2D | UNFILTERED CDHP + CaO, 1-hr | — | 4,212 | 1,036 | 2,433 | 12.10 |
| 3A | $Fe^{+3}$ + CaO, 1-hr, FILTERED | 29 | 0 | 0 | 0 | 4.50 |
| 3B | $Fe^{+3}$ + CaO, 1-hr, UNFILTERED | 29 | 0 | 0 | 0 | 4.50 |
| 3C | FILTERED CDHP + CaO, 1-hr | — | 4,066 | 1,000 | 3,987 | 12.30 |
| 3D | UNFILTERED CDHP + CaO, 1-hr | — | 4,101 | 1,009 | 3,255 | 12.40 |
| 4A | $Fe^{+3}$ + CaO, 1-hr, FILTERED | 40 | 0 | 0 | 13 | 4.05 |
| 4B | $Fe^{+3}$ + CaO, 1-hr, UNFILTERED | 40 | 0 | 0 | 13 | 4.05 |
| 4C | FILTERED CDHP + CaO, 1-hr | — | 4,090 | 1,006 | 3,105 | 11.45 |
| 4D | UNFILTERED CDHP + CaO, 1-hr | — | 4,293 | 1,056 | 2,834 | 10.85 |
| 5A | $Fe^{+3}$ + CaO, 1-hr, FILTERED | 51 | 0 | 0 | 42 | 6.15 |
| 5B | $Fe^{+3}$ + CaO, 1-hr, UNFILTERED | 51 | 0 | 0 | 42 | 6.15 |
| 5C | FILTERED CDHP + CaO, 1-hr | — | 4,054 | 997 | 4,899 | 12.15 |
| 5D | UNFILTERED CDHP + CaO, 1-hr | — | 4,093 | 1,007 | 4,337 | 12.15 |
| 6A | $Fe^{+3}$ + CaO, 1-hr, UNFILTERED | 98 | 0 | 0 | 132 | 6.20 |
| 6B | CDHP + CaO, 1-hr | — | 2,079 | 512 | 1,621 | 11.25 |
| 7A | $Fe^{+3}$ + CaO, 1-hr, FILTERED | 99 | 0 | 0 | 135 | 6.36 |
| 7B | CDHP + CaO, 1-hr | — | 2,089 | 514 | 1,580 | 11.40 |
| 8A | CDHP + CaO, 1-hr | — | 2,041 | 502 | 1,562 | 11.50 |
| 8B | $Fe^{+3}$, 30-min | 100 | 0 | 0 | 0 | 10.53 |
| 9A | $Fe^{+3}$ + CaO, 30-min | 101 | 0 | 0 | 218 | 9.50 |
| 9B | CDHP + CaO, 1-hr | — | 2,047 | 504 | 1,354 | 11.00 |
| 10 | $Fe^{+3}$ + CDHP + CaO | 103 | 2,051 | 505 | 2,501 | 11.90 |

For purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained by the present invention. It is noted that, as used in this specification and the appended claims, the singular forms "a," "an," and "the," include plural references unless expressly and unequivocally limited to one referent. The use of "including," "comprising," or "having," "containing," "involving," and variations thereof herein, is meant to encompass the items listed thereafter and equivalents thereof as well as additional items.

This description uses examples to disclose the invention, including the best mode, and also to enable any person skilled in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference.

TABLE 7

| Species | Untreated (ppm) | Test 1 | Test 2 | Test 3 | Test 4 | Test 5 | Test 6 | Test 7 | Test 8 | Test 9 | Test 10 | Test 11 | Test 12 |
|---|---|---|---|---|---|---|---|---|---|---|---|---|---|
| $F^-$ | 7 | 6.8 | 7.2 | 6.4 | 3.5 | 6.5 | 6.2 | 6.3 | 3.3 | 6.2 | <1 | <1 | <1 |
| $Cl^-$ | 11 | 10 | 10 | 11 | 13 | 10 | 10 | 10 | 14 | 10 | 14 | 15 | 17 |
| $NO_3^-$ | 8.6 | 3 | 2.8 | 3.2 | 3 | 3.3 | 2.9 | 3.1 | 3 | 3.4 | 3 | 4 | 3 |
| $SO_4^{2-}$ | 800 | 900 | 900 | 900 | 920 | 900 | 890 | 890 | 890 | 910 | 430 | 630 | 520 |
| $PO_4^{3-}$ | — | — | — | — | — | — | — | — | — | — | — | <10 | — |
| Al | 0.065 | 0.0751 | 0.0461 | 0.004 | <0.01 | 0.0058 | 0.0203 | 0.0303 | <0.01 | 0.0151 | <0.01 | <0.01 | 0.065 |
| As | <0.003 | <0.003 | <0.003 | <0.003 | <0.015 | <0.003 | <0.003 | <0.003 | <0.015 | <0.003 | <0.015 | <0.015 | <0.015 |
| Cd | 0.019 | 0.0172 | 0.0113 | 0.0049 | <0.005 | 0.0124 | 0.0048 | 0.0047 | <0.005 | 0.0046 | <0.005 | <0.005 | <0.005 |
| Co | 0.130 | 0.0455 | 0.0318 | <0.004 | <0.02 | 0.0353 | <0.004 | <0.004 | <0.02 | <0.004 | <0.02 | <0.02 | <0.02 |
| Cu | <0.005 | <0.005 | <0.005 | <0.005 | <0.025 | <0.005 | <0.005 | <0.005 | <0.025 | <0.005 | <0.025 | 0.030 | 0.054 |
| Fe | <0.1 | <0.1 | <0.1 | <0.1 | <0.1 | <0.1 | <0.1 | <0.1 | <0.1 | <0.1 | <0.1 | <0.1 | <0.1 |
| Mn | 25.6 | 15.4 | 15.2 | <0.004 | <0.02 | 15.2 | 0.0087 | 0.0099 | <0.02 | 0.7 | <0.02 | <0.02 | <0.02 |
| Mo | 2.100 | 1.7 | 1.7 | 1.8 | 1.1 | 1.8 | 1.8 | 1.8 | 1.1 | 1.8 | 1.0 | 1.3 | 0.9 |
| Ni | 0.260 | 0.2 | 0.0853 | <0.010 | <0.05 | 0.2 | <0.010 | <0.010 | <0.05 | <0.010 | <0.05 | <0.05 | <0.1 |
| P | <0.1 | <0.1 | <0.1 | <0.1 | <0.1 | <0.1 | <0.1 | <0.1 | <0.1 | <0.1 | <0.1 | 1.9 | <0.02 |
| Si | 5.500 | 5.8 | 5.7 | 2.8 | 2.4 | 5.8 | 3.1 | 3.1 | 1.6 | 3.6 | 0.1 | 4.1 | 1.2 |
| Sr | 4.100 | 3.9 | 4.0 | 3.6 | 3.8 | 4.0 | 3.5 | 3.5 | 3.8 | 3.6 | 2.2 | 0.9 | 1.0 |
| Zn | 1.890 | 0.83 | 0.4 | <0.010 | <0.1 | 0.6 | <0.010 | <0.010 | <0.1 | <0.010 | <0.1 | <0.1 | <0.1 |

TABLE 9

| Species | Un-treated (ppm) | Test 1A | Test 1C | Test 1D | Test 2A | Test 2C | Test 2D | Test 3A | Test 3C | Test 3D | Test 4A | Test 4C | Test 4D |
|---|---|---|---|---|---|---|---|---|---|---|---|---|---|
| $F^-$ | 7 | 6.6 | 1.2 | <1 | 6.8 | <1 | <1 | 7.2 | 1 | <1 | 6.9 | <1 | <1 |
| $Cl^-$ | 11 | 13 | 13 | 11 | 14 | 14 | 15 | 14 | 12 | 13 | 12 | 11 | 11 |
| $NO_3^-$ | 8.6 | 4 | 16 | 3 | 9 | 15 | 14 | 3 | 2 | 3 | 4 | 5 | 3 |
| $SO_4^{2-}$ | 800 | 940 | 370 | 350 | 980 | 500 | 510 | 1,000 | 470 | 480 | 1,000 | 190 | 270 |
| $PO_4^{3-}$ | — | — | — | — | — | — | — | — | — | — | — | — | — |
| Al | 0.065 | 0.134 | 0.021 | 0.015 | 0.191 | 0.084 | 0.255 | 2.68 | 0.022 | 0.014 | 2.96 | 0.009 | 0.061 |
| Cd | 0.019 | 0.01 | <0.005 | <0.005 | 0.009 | <0.005 | <0.005 | 0.012 | <0.005 | <0.005 | 0.011 | <0.005 | <0.005 |
| Co | 0.130 | 0.015 | <0.005 | <0.005 | 0.017 | <0.005 | <0.005 | 0.007 | <0.005 | <0.005 | <0.005 | <0.005 | <0.005 |
| Fe | <0.1 | 0.009 | 0.038 | 0.03 | 0.016 | 0.093 | 0.039 | 0.056 | 0.076 | 0.031 | 0.812 | 0.011 | 0.01 |
| Mn | 25.6 | 11.4 | <0.005 | <0.005 | 11.2 | <0.005 | <0.005 | 8.14 | <0.005 | <0.005 | 6.1 | <0.005 | <0.005 |
| Mo | 2.100 | 0.939 | 0.672 | 0.998 | 0.313 | 0.310 | 1.02 | 0.029 | 0.073 | 1.1 | 0.048 | 0.062 | 0.307 |
| Ni | 0.260 | 0.115 | <0.005 | <0.005 | 0.119 | <0.005 | <0.005 | 0.119 | <0.005 | <0.005 | <0.005 | <0.005 | <0.005 |
| P | <0.1 | <0.1 | 0.124 | <0.1 | <0.1 | 0.131 | <0.1 | <0.1 | <0.1 | <0.1 | <0.1 | <0.1 | <0.1 |
| Si | 5.500 | 6.11 | 0.11 | 0.07 | 5.33 | 0.1 | 0.15 | 7.67 | 0.08 | 0.06 | 7.23 | 0.15 | 0.20 |
| Zn | 1.890 | 1.1 | 0.063 | 0.051 | 1.02 | 0.061 | 0.074 | 1.77 | 0.059 | 0.05 | 1.84 | 0.045 | 0.051 |

| Species | Un-treated (ppm) | Test 5A | Test 5C | Test 5D | Test 6A | Test 6B | Test 7A |
|---|---|---|---|---|---|---|---|
| $F^-$ | 7 | 6.4 | <1 | <1 | 6 | <1 | 6 |
| $Cl^-$ | 11 | 11 | 12 | 12 | 10 | 10 | 11 |
| $NO_3^-$ | 8.6 | 8 | 10 | 3 | 4 | 4 | 3 |
| $SO_4^{2-}$ | 800 | 1,100 | 470 | 480 | 1,200 | 750 | 1,200 |
| $PO_4^{3-}$ | — | — | — | — | — | — | — |
| Al | 0.065 | 0.943 | 0.017 | 0.02 | <0.01 | 0.0245 | <0.01 |
| Cd | 0.019 | 0.012 | <0.005 | <0.005 | 0.0122 | <0.005 | 0.0101 |
| Co | 0.130 | 0.018 | <0.005 | <0.005 | <0.02 | <0.02 | <0.02 |
| Fe | <0.1 | 0.012 | 0.032 | 0.054 | <0.1 | <0.1 | <0.1 |
| Mn | 25.6 | 11.2 | <0.005 | <0.005 | 13.2 | <0.02 | 13 |
| Mo | 2.100 | 0.107 | 0.097 | 1.07 | 0.0705 | 0.407 | 0.1385 |
| Ni | 0.260 | 0.128 | <0.005 | <0.005 | 0.0932 | <0.05 | 0.0843 |
| P | <0.1 | <0.1 | <0.1 | <0.1 | <0.1 | <0.1 | <0.1 |
| Si | 5.500 | 6.29 | 0.08 | <0.05 | 4.4 | <0.1 | 3.8 |
| Zn | 1.890 | 1.44 | 0.054 | 0.069 | 0.3 | <0.05 | <0.1 |

| Species | Test 7B | Test 8A | Test 8B | Test 9A | Test 9B | Test 10 |
|---|---|---|---|---|---|---|
| $F^-$ | <1 | <1 | <1 | 7 | <1 | <1 |
| $Cl^-$ | 15 | 14 | 10 | 10 | 10 | 34 |
| $NO_3^-$ | 4 | 3 | 3 | 3 | 3 | 3 |
| $SO_4^{2-}$ | 740 | 430 | 900 | 1,200 | 880 | 640 |
| $PO_4^{3-}$ | — | — | — | — | — | — |
| Al | <0.01 | <0.01 | <0.05 | <0.010 | <0.01 | 0.527 |
| Cd | <0.005 | <0.005 | <0.006 | <0.005 | <0.005 | 0.0076 |
| Co | <0.02 | <0.02 | <0.02 | <0.02 | <0.02 | <0.02 |
| Fe | <0.1 | <0.1 | <0.1 | <0.1 | <0.1 | <0.1 |
| Mn | <0.02 | <0.02 | <0.02 | <0.02 | <0.02 | <0.02 |
| Mo | 0.097 | 1.0 | 1 | 0.7 | 0.5 | 1.2 |
| Ni | <0.05 | <0.05 | <0.05 | <0.05 | <0.05 | <0.05 |
| P | <0.1 | <0.1 | <0.1 | <0.1 | <0.1 | <0.1 |
| Si | 0.2 | 0.1 | 0.4 | 0.9 | 0.2 | <0.1 |
| Zn | <0.05 | <0.1 | <0.05 | <0.073 | <0.05 | <0.05 |

The invention claimed is:

1. A method for treating acid mine drainage to reduce the concentration of heavy metals and soluble contaminants, the acid mine drainage contains at least a heavy metal selected from molybdenum, tungsten, chromium, manganese, nickel, arsenic, and vanadium, and at least a soluble anionic species selected from nitrate, nitrite, sulfate, fluoride, and chloride, the method comprising:

contacting the acid mine drainage with an effective amount of at least a trivalent metal cation selected from ferric chloride and ferric sulfate at a pH of 6 or less for the at least a trivalent metal cation to form at least a complex with at least one of the heavy metals;

performing a liquid solid separation to remove the at least a complex forming a first effluent containing less than 0.08 ppm molybdenum, wherein the liquid solid separation is via flocculation and clarification in an inclined plate settler and wherein at least a flocculent is added to the inclined plate settler to bind the at least a complex;

adding at least a phosphate additive to the first effluent at an alkaline pH between 9 and 13 to obtain a soluble phosphrous concentration of less than 1 ppm, and a soluble sulfate concentration of less than 630 ppm, and at least one of the at least a soluble anionic species forms a precipitate;

performing a liquid solid separation to remove the precipitate, forming a second effluent.

2. The method of claim 1, wherein contacting the acid mine drainage with the at least a trivalent metal cation is at a pH between 3.0 and 6.0.

3. The method of claim 2, wherein contacting the acid mine drainage with the at least a trivalent metal cation is at a pH between 3.0 and 5.0.

4. The method of claim 3, wherein contacting the acid mine drainage with the at least a trivalent metal cation is for a sufficient amount of time for at least 50% of the heavy metals to form an insoluble complex with the at least a trivalent metal cation.

5. The method of claim 1, wherein the effective amount of the at least a trivalent metal cation ranges from 6 to 50 ppm of the at least a trivalent metal cation to each ppm of heavy metals contained in the acid mine drainage.

6. The method of claim 1, wherein the acid mine drainage contains manganese and the second effluent contains less than 0.005 ppm manganese.

7. The method of claim 1, wherein the acid mine drainage contains nickel and the second effluent contains less than 0.010 ppm nickel.

8. The method of claim 1, wherein the acid mine drainage contains zinc and the second effluent contains less than 0.05 ppm zinc.

9. The method of claim 1, wherein the acid mine drainage contains aluminum and the second effluent contains less than 0.02 ppm aluminum.

10. The method of claim 1, wherein the at least a phosphate additive comprises a mixture of phosphoric acid and at least a salt of calcium bicarbonate.

11. The method of claim 1, wherein the flocculent is an anionic polymer.

12. The method of claim 1, wherein the liquid solid separation to remove the heavy metal complex is via coagulation.

13. The method of claim 1, wherein the pH of the first effluent is adjusted to 9.0 to 12.0 by adding lime.

14. The method of claim 1, wherein the at least a phosphate additive is selected from the group of hydroxyapatite, hexametaphosphate, polyphosphate, monocalcium phosphate, dicalcium phosphate, tricalcium phosphate, calcium orthophosphates, calcium dihydrogen phosphate monohydrate, phosphate fertilizers, phosphate rock, pulverized phosphate rock, calcium orthophosphates, animal bone phosphate, and combinations thereof.

15. The method of claim 14, wherein the at least a phosphate additive is a phosphate fertilizer selected from monoammonium phosphate (MAP), diammonium phosphate (DAP), single superphosphate (SSP), triple superphosphate (TSP), and combinations thereof.

16. The method of claim 14, wherein the at least a phosphate additive is calcium dihydrogen phosphate monohydrate.

17. The method of claim 1, wherein the at least a phosphate additive is added in an amount sufficient to provide 500 to 2000 ppm of phosphrous content.

18. The method of claim 1, wherein the acid mine drainage contains fluoride, and a sufficient amount of the at least a phosphate additive is added to the first effluent to reduce the concentration of fluoride in the first effluent to less than 1 ppm.

19. The method of claim 1, wherein the acid mine drainage contains sulfate, and a sufficient amount of the at least a phosphate additive is added to the first effluent to reduce the concentration of sulfate in the first effluent to less than 300 ppm.

20. The method of claim 1, further comprising adjusting the pH of the second effluent to less than 9 for on-site or off-site reuse or discharge.

21. The method of claim 20, wherein the pH of the second effluent is adjusted by addition of carbon dioxide.

22. A method for treating effluent water from excavations and extractions to reduce the concentration of heavy metals and soluble contaminants in the effluent water, comprising:
   providing effluent water having a pH from 2.0 to 10.0, one or more heavy metal ions or metal salts selected from molybdenum, tungsten, manganese, nickel, chromium, arsenic, and vanadium, and at least a soluble anionic species selected from nitrate, nitrite, sulfate, fluoride, and chloride;
   contacting the effluent water with ferric ion in an amount effective and at a pH of 6 or less for the ferric iron to form at least an insoluble complex with at least one of the heavy metals;
   performing a liquid solid separation to remove the at least a insoluble complex forming a first effluent containing less than 0.08 ppm molybdenum, wherein the liquid solid separation is via flocculation and clarification in an inclined plate settler and wherein at least a flocculent is added to the inclined plate settler to bind the at least an insoluble complex;
   adding at least a phosphate fertilizer to the first effluent for a soluble phosphrous concentration of less than 1 ppm, and a soluble sulfate concentration of less than 630 ppm, and at least one of the at least a soluble anionic species forms a precipitate at an alkaline pH between 9 and 13; and
   performing a liquid solid separation to remove the precipitate, forming a second effluent.

23. The method of claim 22, wherein the at least a phosphate fertilizer is selected from the group of single superphosphate and triple superphosphate.

* * * * *